(12) United States Patent
Caldwell

(10) Patent No.: US 6,339,311 B1
(45) Date of Patent: Jan. 15, 2002

(54) PHOTOVOLTAIC POWER SOURCE FOR PORTABLE ELECTRONIC DEVICE

(75) Inventor: Barry E. Caldwell, Heston, KS (US)

(73) Assignee: LSI Logic Corporation, Milpitas, CA (US)

(*) Notice: Subject to any disclaimer, the term of this patent is extended or adjusted under 35 U.S.C. 154(b) by 0 days.

(21) Appl. No.: 09/713,085

(22) Filed: Nov. 15, 2000

(51) Int. Cl.$^7$ ............................... H02J 7/00; H02J 9/00
(52) U.S. Cl. ............................................ 320/101; 307/64
(58) Field of Search ............................... 320/101, 137; 307/66, 64, 44, 23

(56) References Cited

U.S. PATENT DOCUMENTS

| | | | | |
|---|---|---|---|---|
| 5,644,207 A | * | 7/1997 | Lew et al. | 320/101 |
| 6,084,379 A | * | 7/2000 | Buniatyan | 320/101 |
| 6,184,654 B1 | * | 2/2001 | Bachner, III et al. | 320/114 |

* cited by examiner

Primary Examiner—Gregory Toatley
(74) Attorney, Agent, or Firm—Lathrop & Gage L. C.

(57) ABSTRACT

A battery charging circuit for portable electronic devices including a photovoltaic cell for generating electrical current for charging of batteries. The charging circuit includes a state machine charge control circuit to selectively apply the electrical current generated by the photovoltaic cell to the batteries for charging and/or to the operational circuits of the portable electronic device for operation of the device. The photovoltaic cell, charge control circuit and operational circuits may be packaged in a number of alternative embodiments. In a first embodiment the photovoltaic cell and charge control circuit are integrated in a single circuit package. In a second, the various components are in separate circuit packages to enhance flexibility in design options. In a third embodiment, the charge control circuit is integrated with the operational circuits of the device. The charging circuit may be physically affixed to the portable device or may be electrically coupled to the device through a holder used to carry the device when not in use.

18 Claims, 4 Drawing Sheets

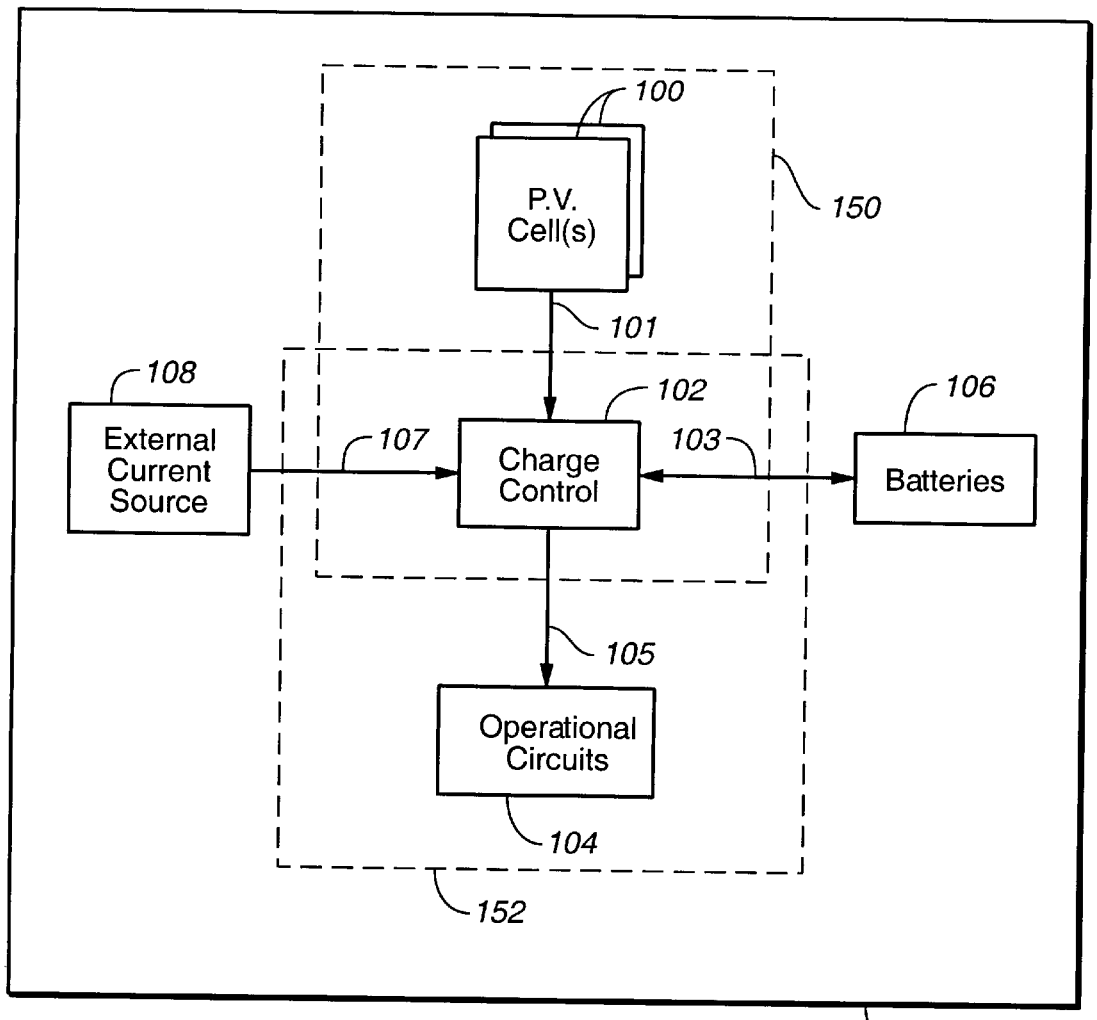
FIG._1

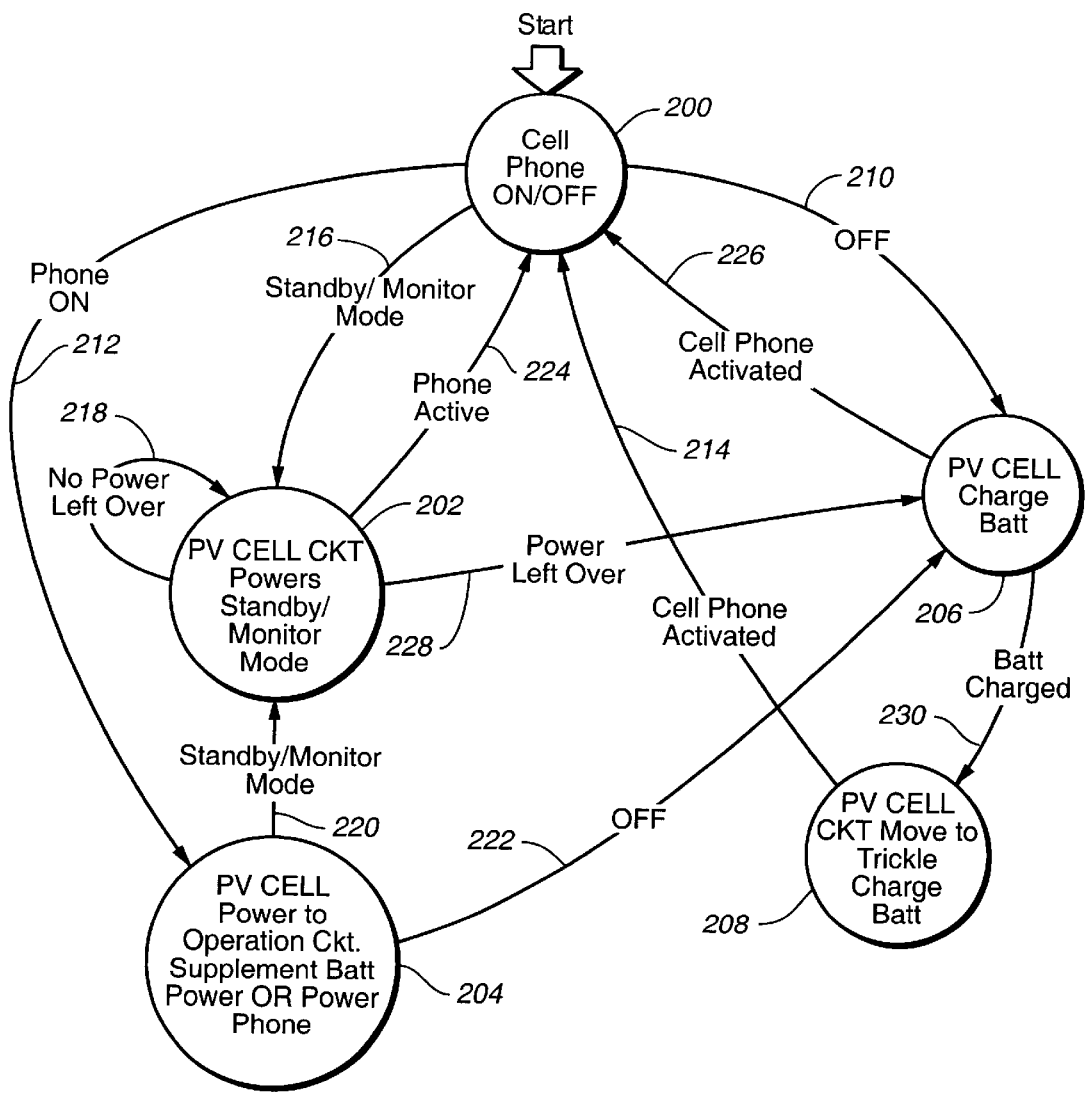
FIG._2

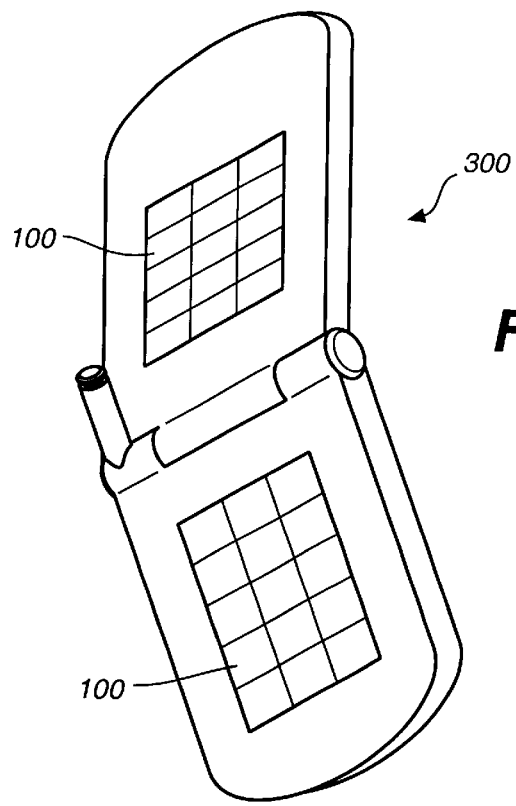
FIG._3A
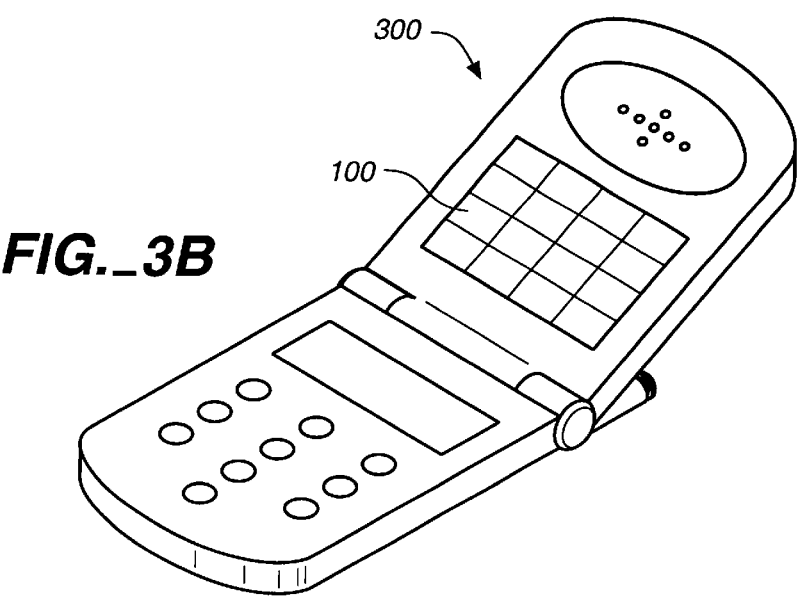
FIG._3B

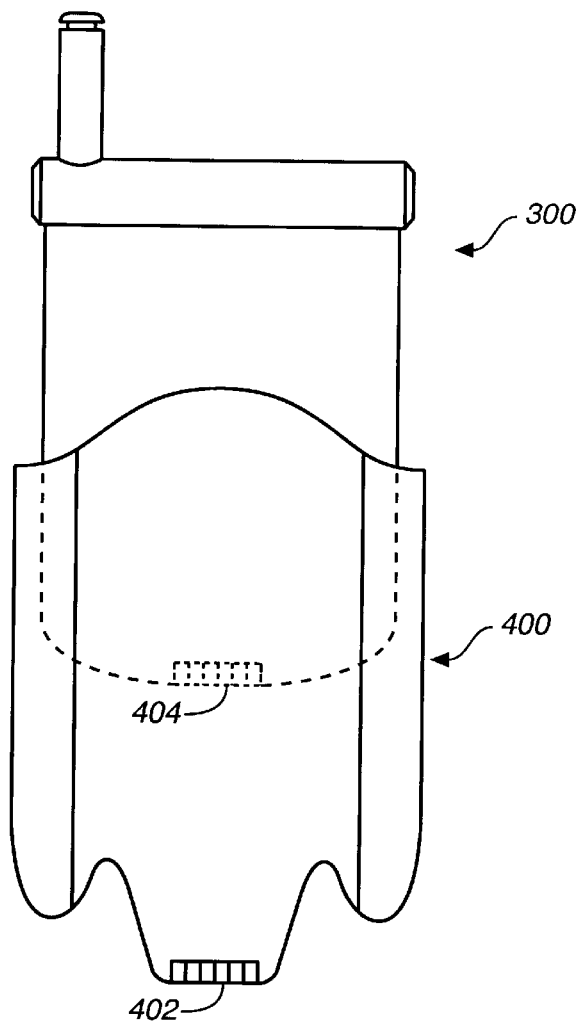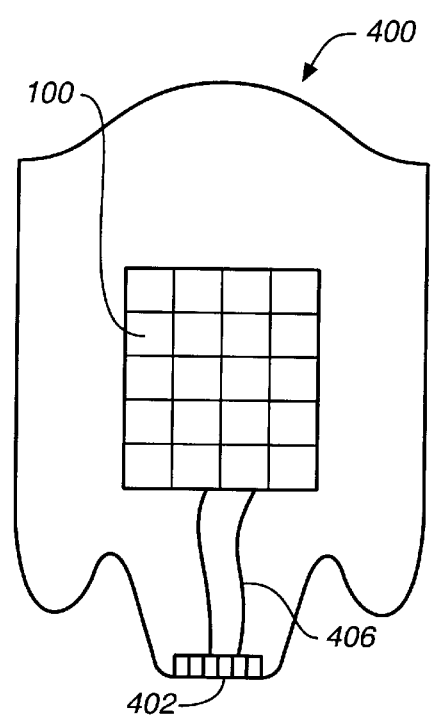
FIG._4A
FIG._4B

PHOTOVOLTAIC POWER SOURCE FOR PORTABLE ELECTRONIC DEVICE

Background of the Invention

1. Field of the Invention

The present invention relates to power sources for portable electronic devices and more specifically relates to a photovoltaic power source for operating and charging a portable electronic device.

2. Discussion of Related Art

Popularity of portable electronic devices for computing and communications is growing at a rapid pace. Such portable devices include, for example, cellular telephones, portable telephones, personal digital assistants (PDAs), portable computers (laptops and notebooks), etc. Batteries typically power such portable electronic devices. To reduce costs in such devices, the batteries are typically rechargeable to thereby reduce costs incurred by the user for frequent replacement of nonrechargeable batteries.

A common problem for all such battery-powered portable electronic devices is the need to recharge the batteries of the device. In general, as presently practiced in the art, recharging the batteries of such a portable electronic device entails plugging the device into a nearby power source via a cable or cord. For example, a cellular phone may be plugged into an associated AC adapter to recharge its batteries from power supplied by a standard wall outlet. Similarly, automobile adapters allow a cellular telephone to recharge from an automobile's power source.

All presently known in techniques and apparatus for recharge in the batteries of such a portable electronic device involve plugging the electronic device into an appropriate power source and permitting the device to be recharged. Although presently known charging systems permit the device to be used in during the recharge, presently known charging systems involve a cord or cable connecting the portable electronic device to a suitable power source. Portability of the electronic device is thereby diminished due to the constraints of the attached cable or cord.

In view of the above discussion it is evident that a need exists for improved power source and charging designs for portable electronic devices whereby true portability of the device is maintained while charging.

SUMMARY OF THE INVENTION

The present invention solves the above and other problems, thereby advancing the state of the useful arts, by providing structure and methods for utilizing photovoltaic cells and associated switching and charging circuits to provide charging for batteries in portable electronic devices. Use of a photovoltaic cell for providing power and charging of batteries in a portable electronic device retains full portability of the device while charging the batteries.

The charging system of the present invention may be beneficially utilized in conjunction with most portable electronic devices including in particular, cellular phones, portable phones, PDAS, and portable computers. In one preferred exemplary embodiment, the photovoltaic cell is mounted to an external surface of a cell phone such that it is normally exposed when the cell phone is inserted in a carrying cradle or case. When exposed to appropriate frequencies of light (e.g., sunlight) the photovoltaic cells and associated charging circuits provide a constant source of charging power for the batteries of the cellular phone. Similar designs in other preferred embodiments permit similar charging for batteries associated with portable phones, PDAs, or portable computers.

A state machine circuit of the present invention provides for automatic switching of the power generated by the photovoltaic cells into a charging mode for recharge in the batteries as well as a primary power mode for use as the primary power source in operating the portable electronic device.

A number of implementation design choices are possible for implementing features of the present invention. In a first preferred embodiment, photovoltaic cells are connected to the state machine and associated current control circuits fabricated directly with the photovoltaic cell array as an integrated component thereof. In a second preferred embodiment, the photovoltaic cells and the state machine and associated current control circuits are fabricated in separate components thereby permitting additional modularity in the selection of photovoltaic cells for particular applications. In yet another preferred embodiment, the charging state machine and associated current control circuits are integrated directly with custom devices and circuits within the portable electronic device. Such a solution may help reduce total component cost for low-end electronic devices. The various embodiments each provide particular benefits with respect to particular attributes of the circuits including modularity, flexibility of circuit design selections, integration and costs.

These and other features, aspects and benefits of the present invention will be readily apparent to those skilled in the art through a more careful reading of the following description and associated drawings as follows.

BRIEF DESCRIPTION OF THE DRAWINGS

FIG. 1 is a block diagram of essential elements of a portable electronic device applying photovoltaic charge elements in accordance with the present invention.

FIG. 2 is a state diagram describing operation of the charge control circuit of FIG. 1.

FIG. 3 is a diagram showing two perspectives views of a first exemplary preferred physical embodiment of a portable electronic device utilizing photovoltaic cells in accordance with the present invention.

FIG. 4 is a diagram showing two views of a second exemplary preferred physical embodiment of a portable electronic device with a holder utilizing photovoltaic cells in accordance with the present invention.

DETAILED DESCRIPTION OF THE PREFERRED EMBODIMENTS

While the invention is susceptible to various modifications and alternative forms, a specific embodiment thereof has been shown by way of example in the drawings and will herein be described in detail. It should be understood, however, that it is not intended to limit the invention to the particular form disclosed, but on the contrary, the invention is to cover all modifications, equivalents, and alternatives falling within the spirit and scope of the invention as defined by the appended claims.

FIG. 1 is a block diagram depicting functional elements of the present invention in a portable electronic device 1. A typical portable electronic device 1 such as a cell phone, portable phone or portable computing device (PDA, notebook or laptop) includes a variety of operational circuits 104, batteries 106 for powering the portable electronic device for mobile use, and an optional external current source 108 such as an AC wall adapter for recharging batteries 106. The charging system of the present invention further includes photovoltaic cells 100 for providing electric current as a source of power in the portable electronic device. Both the photovoltaic cells 100 and the external current source 108 are coupled to a charge control circuit 102. Charge control circuit 102 selectively applies the currents generated by the various current sources and the batteries 106 to control charging of the batteries 106 and to enable operation of the portable electronic device 1 through operational circuits 104.

In accordance with the present invention, photovoltaic cells 100 provide a current source for use in operating the portable electronic device 1 and/or for charging batteries 106. Photovoltaic cells 100 generate electrical current when exposed to appropriate frequencies of light. Electrical current so generated is applied via path 101 to charge control circuit 102. In like manner, external current source 108, if present, applies electrical current to charge control circuit 102 via path 107. Both photovoltaic cells 100 and external current source 108 are sources of electrical current for management by current control circuit 102. Since the present invention relates primarily to the use of photovoltaic cells 100, further discussion of the current generated by external current source 108 is not necessary. For purposes of recharging batteries 106, charge control circuit 102 applies electrical current from one of the sources of electrical current to batteries 106 via path 103.

Charge control circuit 102 manages the various sources electrical current to fulfill power needs within the portable electronic device 1, namely: recharging batteries 106 and powering operational circuits 104 of the portable electronic device 1. As noted above, when recharging batteries 106, charge control circuit 102 applies electrical current generated by photovoltaic cells 100 to batteries 106 via path 103. When supplying electrical current for operating the portable electronic device 1, charge control circuit 102 applies electrical current to operational circuits 104 via path 105. The source of such operational electrical current may be either batteries 106 (via path 103), photovoltaic cells 100 (via path 101) or external current source 108 via path 107 or combinations of the sources. In the preferred embodiment, charge control circuit 102 operates in accordance with a state machine model to control appropriate application of electrical current to fulfill both needs of the portable electronic device 1 (i.e., recharging to batteries 106 and/or operating operational circuits 104).

Also shown in FIG. 1 are three physical embodiments of the present invention as regards physical packaging of the various circuits shown therein. In a first exemplary preferred embodiment, photovoltaic cells 100, charge control circuit 102 and operational circuits 104 are implemented as independent circuit packages (i.e., independent integrated circuit chips). In a second exemplary preferred embodiment, photovoltaic cells 100 and charge control circuit 102 are integrated within a single integrated circuit package as depicted by the dashed line 150. In a third exemplary preferred embodiment, charge control circuit 102 and operational circuits 104 are integrated within a single integrated circuit package as depicted by dashed line 152.

Each of these three exemplary preferred physical embodiments provides certain benefits and gives rise to other weaknesses with regard to particular applications of the invention. For example, the first preferred embodiment in which each component is a distinct circuit package enhances flexibility and modularity for selection of different components for each functional element. However, such flexibility may add to cost or packaging complexity for the portable electronic device. By contrast, the second and third exemplary preferred embodiments reduce cost and complexity by enhancing integration of particular components. However, such reduction in cost may diminish flexibility in the selection of individual components. Those skilled in the art will readily recognize such design choices in implementation of the present invention.

FIG. 2 is a state machine state diagram describing operation of charge control circuit 102 of FIG. 1. In the preferred embodiment of the present invention a state machine model monitors various operating modes of the portable electronic device to manage the allocation of electrical current for purposes of operating the device and for purposes of charging the batteries. Depending on various events and modes of operation of the device the state machine controls allocation of electrical current generated by the photovoltaic cells to permit operation of the device and to enable charging of the batteries.

The state machine model of the present invention suggests three operating modes of the portable electronic device (i.e., a cellular phone). An operating or "ON" mode wherein the device is in ready for use by a user, an "OFF" mode wherein the device is turned off by the user, and a "STANDBY/MONITOR" mode wherein the device is in a low power consumption mode during non-use. Many portable electronic devices utilize such a STANDBY mode to reduce power consumption by higher power components within the device during periods of non-use. In computers it is common that peripheral devices such as disk drives and display screens consume significant power by comparison to the central processor and its memory. Portable and desktop computers therefore often utilize such low power modes to reduce power consumption and thereby save battery power or simply reduce wasted power consumption. Most present computers have preprogrammed timeout values the expiration of which will automatically cause the computer to enter a low power STANDBY mode. Many have keys on the keyboard to permit a user to explicitly force entry to the STANDBY mode to reduce power consumption. Many portable computers in particular have switches for sensing the closing of the portable computer cover to force entry into the STANDBY mode. Other portable electronic devices, such as cell phones, may benefit from such power management for purposes of distributing electrical current from photovoltaic cells to operational circuits and to the charging of batteries as appropriate.

In these various modes, state transitions exemplified by the state model diagram of FIG. 2 determine how to apply the current (if any) generated by the photovoltaic cells for purposes of operating the device and/or charging the batteries.

The state machine model of FIG. 2 begins at initial state 200 from which it is determined whether the portable electronic device is in an ON or OFF mode. "ON" and "OFF" as used herein refer to operational modes of the device. Those skilled in the art will recognize that operation of charge control circuit 102 to perform the state machine model depicted in FIG. 2 requires a minimum level a power for operating the charge control circuit 102. The present invention ignores the situation where all sources of power are removed from the device leaving no source of electrical current to operate any circuits of the device.

From initial state 200, if it is determined that the portable electronic device is presently in an OFF mode, a transition via path 210 is made to state 206 to enable charging of the batteries as described further herein below. From initial state 200, if it is determined that the portable electronic device is in the ON mode, a transition is made via path 212 to state 204 to determine an appropriate allocation of current for operating the portable electronic device as described further herein below. If the device was previously in a STANDBY mode, a transition is made back to state 202 as described further herein below to maintain the STANDBY mode.

Those skilled in the art will recognize that well-known design choices may determine the precise number of states and the transitions appropriate between the various states. The state model diagram of FIG. 2 is therefore intended merely as exemplary of one possible implementation of the features of the present invention. For example, different types of portable electronic devices may have no such STANDBY mode while others may have a plurality of such modes wherein different power consumption levels are associated with each of the various STANDBY modes.

In state 204, the device is operated utilizing an available source of electrical current from either the photovoltaic cells or from the batteries of the portable electronic device. If sufficient electric current is available from the photovoltaic cells, operational power for the operational circuits of the portable electronic device is received from the electrical current generated by the photovoltaic cells. If the electrical current from the photovoltaic cells is insufficient to operate the portable electronic device, supplemental power is drawn from the batteries and combined with the electrical current supplied by the photovoltaic cells (if any) to maintain operation of the portable electronic device. Well-known circuits to controllably combine electrical current from two such sources are readily available and represent a simple matter of design choice to those skilled in the art.

From state 204, if a request is made by the user to turn off the portable electronic device, a transition is made via path 222 to state 206 to continue charging the batteries from electrical current (if any) supplied by the photovoltaic cells. If the operational use of the device is completed but the user does not turn the device off, a timeout or other timed event causes the device to enter state 202 via path 220 to enter the STANDBY/MONITOR mode.

In state 202 (STANDBY mode) the device continues to operate in a low power mode awaiting a user request or an external event to resume normal full power operation of the device. While operating, current monitoring circuits known in the art determine whether the electrical current generated by the photovoltaic cells is in excess of the current needed to operate the portable electronic device in STANDBY mode. As noted above, if excess current is available from the photovoltaic cells, a transition is made via path 228 to state 206 to charge the batteries using that excess current (while remaining in STANDBY mode). If the current is not sufficient to permit charging of the batteries, a path 218 indicates a transition to remain in state 202 (remain in the STANDBY mode without attempting to charge the batteries from electrical current generated by the photovoltaic cells).

As noted, the state machine remains in this STANDBY mode (in state 202, 206 or 208) until some event or request signifies that the portable electronic device should be again activated. Exemplary of such a user request may be the pressing of a button or other user interface indicia to initiate use of the device (i.e., entering a phone number on a portable or cellular phone device). Exemplary of an external event may be the plugging of an external power source to the device or, as in a cellular or portable phone, recognition of an incoming call signal. Upon occurrence of such a user request or external event (also referred to herein as a request to activate the device), a transition is made via path 224 back to state 200 from whence a transition is made depending upon whether the device was previously in the ON or OFF mode. While in state 202, if there is any excess electrical current generated by the photovoltaic cells, a transition is made via path 228 to state 206 to apply the left over current to the charging of the batteries. In state 206, the device remains in STANDBY mode awaiting an event to resume normal operation.

In state 206 (while in STANDBY mode), electrical current from the photovoltaic cells is applied to the batteries of the portable electronic device to maintain full charge of the batteries. If the charge control circuit determines that the batteries have been fully charged, the transition is made via path 230 to state 208 to maintain full charge of the batteries using well-known trickle charge techniques. In this trickle charge state 208, electrical current from the photovoltaic cells is periodically applied to the batteries to maintain full charge of the batteries. In state 206, the device remains in STANDBY mode awaiting an event to resume normal operation.

From state 206 or state 208, upon sensing a request or event to activate the portable electronic device, a transition is made via path 226 or path 214, respectively, back to initial state 200 as discussed above. If state 206 or 208 is entered from the STANDBY mode (i.e., from state 202 via path 228 and thence via path 230), a flag is retained in the state machine so that STANDBY mode is retained if an event causes a transition back to state 200. From state 200, as noted above, the flag is inspected to determine that the device is still in the STANDBY mode and a transition is made from state 200 to state 202 via path 216.

FIG. 3 depicts an exemplary physical placement of photovoltaic cells 100 on a portable electronic device (specifically as pictured a cellular telephone 300). As shown in FIG. 3, in this first exemplary preferred embodiment, one or more photovoltaic cells 100 are affixed directly to the portable electronic device on any surfaces that may be exposed to a source of light during use and/or nonuse of the portable electronic device.

FIG. 4 depicts a the second exemplary physical placement of photovoltaic cells 100 on a holder or cover associated with the portable electronic device (specifically as pictured a cellular telephone 300). In this second exemplary preferred physical embodiment, photovoltaic cells 100 are affixed to holder 400 so as to minimize or eliminate the impact of changes to the portable electronic device per se. In other words, no changes need be made to the portable electronic device (i.e. cellular phone 300) to utilize the charging system of the present invention. Rather, a modified holder 400 has a photovoltaic cell 100 affixed thereto and electrically coupled via path 406 to mated electrical connectors 402 and 404. When portable electronic device 300 is inserted into holder 400, electrical connectors 402 and 404 are mated to permit application of electrical current generated by photovoltaic cells 100 to charging control circuits (not shown) within portable electronic device 300. This second exemplary preferred physical embodiment enables "aftermarket" holders to be provided to enhance the features of existing portable electronic devices. In this sense, the term portable electronic devices as used herein is intended to include such accessory holders or covers electronically coupled to the portable electronic device to permit utilization of the photovoltaic charging features of the present invention.

Those skilled in the art will readily recognize that the portable electronic device 300 depicted in FIGS. 3 and 4 is intended merely as exemplary of one possible portable electronic device in which the charging system of the present invention may be advantageously applied. Other exemplary devices include portable telephones, portable computers (laptops and notebooks) and PDAs. In like manner the particular holder 400 depicted in FIG. 4 as a cradle for a cellular telephone is intended merely as exemplary of such holder. Other exemplary holders may include soft covers and so-called "docking stations" for telephones, computers or PDAs.

While the invention has been illustrated and described in the drawings and foregoing description, such illustration and description is to be considered as exemplary and not restrictive in character, it being understood that only the preferred embodiment and minor variants thereof have been shown and described and that all changes and modifications that come within the spirit of the invention are desired to be protected.

What is claimed is:

1. A charging circuit for a portable electronic device comprising:
   a photovoltaic component associated with said portable electronic device for generating electrical current when exposed to a light source; and
   a charge control circuit electronically connectable to said photovoltaic component for applying said current to batteries within said portable electronic device,
   wherein said charge control circuit includes a state machine for controllably applying said current to said batteries, and
   wherein said portable electronic device is operable in a plurality of operational states and wherein said state machine is operable to controllably apply current to said batteries based upon the present operational state of said portable electronic device.

2. The charging circuit of claim 1 wherein said photovoltaic component and said charge control circuit are affixed to said portable electronic device.

3. The charging circuit of claim 1 wherein said photovoltaic component and said charge control circuit are affixed to a holder electrically coupled to said portable electronic device.

4. The charging circuit of claim 1 wherein said photovoltaic component and said charge control circuit are integrated within a single integrated circuit package.

5. The charging circuit of claim 1 wherein said charge control circuit and said photovoltaic component are implemented as separate electronic components.

6. The charging circuit of claim 5 wherein said charge control circuit is integrated with operational circuits of said portable electronic device in a single integrated circuit package.

7. The charging circuit of claim 1 wherein said state machine includes:
   a first state for applying said current to said batteries for purposes of charging said batteries; and
   a second state for applying said current to operational circuits of said portable electronic device for purposes of operating said portable electronic device,
   wherein said charging circuit operates in accordance with said first state when said portable electronic device is not in use and operates in accordance with said second state when said portable electronic device is in use.

8. The charging circuit of claim 1
   wherein said charge control circuit further includes a standby mode of operation of the portable electronic device, and
   wherein said state machine includes:
      a first state for applying said current exclusively to operational circuits of said portable electronic device to maintain said standby mode of operation; and
      a second state for applying a first portion of said current to said operational circuits to maintain said standby mode of operation and applying a second portion of said current to said batteries for purposes of charging said batteries,
      wherein said charging circuit operates in accordance with said first state when said current is sufficient only to operate said operational circuits and operates in accordance with said second state when said current is in excess of that required to operate said operational circuits.

9. The charging circuit of claim 1
   wherein said charge control circuit further includes a standby mode of operation of the portable electronic device, and
   wherein said state machine includes:
      a first state for applying said current exclusively to operational circuits of said portable electronic device to maintain said standby mode of operation;
      a second state for applying a first portion of said current to said operational circuits to maintain said standby mode of operation and applying a second portion of said current to said batteries for purposes of charging said batteries; and
      a third state for applying a first portion of said current to said operational circuits to maintain said standby mode of operation and applying a second portion of said current to said batteries for purposes of trickle charging said batteries,
      wherein said charging circuit operates in accordance with said first state when said current is sufficient only to operate said operational circuits and operates in accordance with said second state when said current is in excess of that required to operate said operational circuits and said batteries are not fully charged and operates in accordance with third second state when said current is in excess of that required to operate said operational circuits and said batteries are fully charged.

10. A cellular telephone comprising:
    operational circuits for operating the cellular telephone;
    batteries for supplying backup current to operate said cellular telephone;
    a photovoltaic component associated with said cellular telephone for generating electrical current when exposed to a light source; and
    a charge control circuit electronically coupled to said photovoltaic component and coupled to said operational circuits and coupled to said batteries for controllably applying said current to said batteries and to said operational circuits,
    wherein said charge control circuit includes a state machine for controllably applying said current to said batteries, and
    wherein said cellular telephone is operable in a plurality of operational states and wherein said state machine is operable to controllably apply current to said batteries based upon the present operational state of said cellular telephone.

11. The cellular telephone of claim 10 wherein said photovoltaic component and said charge control circuit are affixed to said cellular telephone.

12. The cellular telephone of claim 10 wherein said photovoltaic component and said charge control circuit are affixed to a holder electrically coupled to said cellular telephone.

13. The cellular telephone of claim 10 wherein said photovoltaic component and said charge control circuit are integrated within a single integrated circuit package.

14. The cellular telephone of claim 10 wherein said charge control circuit and said photovoltaic component are implemented as separate electronic components.

15. The cellular telephone of claim 14 wherein said charge control circuit is integrated with said operational circuits in a single integrated circuit package.

16. The cellular telephone of claim 10 wherein said state machine includes:

a first state for applying said current to said batteries for purposes of charging said batteries; and a second state for applying said current to said operational circuits for purposes of operating said cellular telephone, wherein said charging circuit operates in accordance with said first state when said cellular telephone is not in use and operates in accordance with said second state when said cellular telephone is in use.

17. The cellular telephone of claim 10 wherein said charge control circuit further includes a standby mode of operation of the cellular telephone, and wherein said state machine includes:

a first state for applying said current exclusively to said operational circuits to maintain said standby mode of operation; and a second state for applying a first portion of said current to said operational circuits to maintain said standby mode of operation and applying a second portion of said current to said batteries for purposes of charging said batteries, wherein said charging circuit operates in accordance with said first state when said current is sufficient only to operate said operational circuits and operates in accordance with said second state when said current is in excess of that required to operate said operational circuits.

18. The cellular telephone of claim 10 wherein said charge control circuit further includes a standby mode of operation of the cellular telephone, and wherein said state machine includes:

a first state for applying said current exclusively to operational circuits to maintain said standby mode of operation;

a second state for applying a first portion of said current to said operational circuits to maintain said standby mode of operation and applying a second portion of said current to said batteries for purposes of charging said batteries; and a third state for applying a first portion of said current to said operational circuits to maintain said standby mode of operation and applying a second portion of said current to said batteries for purposes of trickle charging said batteries, wherein said charging circuit operates in accordance with said first state when said current is sufficient only to operate said operational circuits and operates in accordance with said second state when said current is in excess of that required to operate said operational circuits and said batteries are not fully charged and operates in accordance with third second state when said current is in excess of that required to operate said operational circuits and said batteries are fully charged.

* * * * *